June 14, 1960   F. P. FEHN, SR   2,941,137
CONTROL CIRCUIT FOR MOTOR-CLUTCH DEVICE
Filed Feb. 14, 1957   4 Sheets-Sheet 2

INVENTOR.
FRANK P. FEHN, SR.
BY
Williams & Tillroy
ATTORNEYS

June 14, 1960   F. P. FEHN, SR   2,941,137
CONTROL CIRCUIT FOR MOTOR-CLUTCH DEVICE
Filed Feb. 14, 1957   4 Sheets-Sheet 3

INVENTOR.
FRANK P. FEHN, SR.
BY
ATTORNEYS

June 14, 1960 F. P. FEHN, SR 2,941,137
CONTROL CIRCUIT FOR MOTOR-CLUTCH DEVICE
Filed Feb. 14, 1957 4 Sheets-Sheet 4

INVENTOR
FRANK P. FEHN, SR.
BY
ATTORNEYS

United States Patent Office 2,941,137
Patented June 14, 1960

2,941,137

CONTROL CIRCUIT FOR MOTOR-CLUTCH DEVICE

Frank P. Fehn, Sr., Canton, Ohio, assignor to E. W. Bliss Company, Canton, Ohio, a corporation of Delaware Filed Feb. 14, 1957, Ser. No. 640,273

41 Claims. (Cl. 318—161)

This invention relates to a power-control circuit, and, in particular, to such circuits in which large quantities of power are to be governed with maximum flexibility and speed, as for supply to a prime mover or torque transmitter capable of delivering high transient torques. Such torque transmitters are disclosed in greater detail in my copending application Serial No. 607,024, filed August 30, 1956, now Patent No. 2,931,928, issued April 5, 1960.

When large quantities of power are to be used in the running of heavy machinery, multiple-phase voltages are usually employed, and it has been difficult, if not impossible, to provide circuitry for flexibly and efficiently delivering quantities of power, ranging smoothly from the bare minimum to the maximum possible, especially when loads are suddenly applied and removed. It has been particularly difficult to perform this operation with any degree of linearity of control, particularly for the lower ranges of transmitted power. The power-delivery circuits have included gaseous discharge devices including pool-type mercury-vapor tubes known as ignitrons, and because of the large number of switching and other transients present in all phases of the supply and of the load circuits, premature firing has characterized the operation of one or more of the phases of the control circuit, so that virtually no reliability has been attainable at the lower ranges of controlled delivery of power. These defects in previous control circuits of the character indicated have been particularly noticeable when attempting to apply them to a prime mover or torque transmitter of the character described in said copending application.

It is, accordingly, an object of the invention to provide improved power-control circuits of the character indicated.

It is another object to provide an improved means for regulating the supply of multiple-phase power to a load, particularly in the lower range of delivered power.

It is also an object to meet the above objects with a device permitting substantially linear control of delivered power, particularly in the lower ranges of control of delivered power.

It is a further object to meet the above objects with a device in which supply and load circuit transients in the various phases of such control circuits shall have minimum deleterious effect on the operation of any one particular control phase.

A specific object is to provide an improved control of the character indicated for prime movers or torque transmitters of the character indicated.

Other objects and various further features of novelty and invention will be pointed out or will occur to those skilled in the art from a reading of the following specification in conjunction with the accompanying drawings. In said drawings, which show, for illustrative purposes only, preferred forms of the invention.

Briefly stated, my invention contemplates an improved means whereby multiple-phase power may be controlled in its delivery to a substantial load. For any particular electrical phase, the amount of power delivered in an electrical cycle is determined by the controlled fraction of the cycle during which the output circuit to the load is transiently completed. The means whereby this fraction of the cycle is adjustably controlled constitutes an important element of the invention, and in accordance with the invention, an in-phase voltage component and a leading-phase voltage component are non-linearly combined to determine closure of the output circuit to the load.

Specifically, in application to a thyratron-operated ignitron for each of the phases of supply to the load, the completion of the circuit to the load is determined by firing the ignitron in response to a signal which fires the thyratron. Considering the anode-cathode voltage on the ignitron as the reference phase for any particular control circuit, my invention contemplates continuously exciting the grid or control circuit of the thyratron with a major voltage component which is an inversion of the reference phase. This inverted (or reversed) reference-phase voltage is adjustably phase-displaced to determine the fractional part of the cycle for power delivery to the load, but in order to avoid premature firing, particularly when the controlled fraction of the cycle is small, I provide for vectorially adding to the control-circuit voltage a negatively biased auxiliary voltage component taken from the leading phase and also reversed, so as to lead the reference voltage at the control circuit. A non-linear resistance, such as a rectifier, permits addition of the biased lead-phase voltage at the control circuit essentially only when the reference-phase voltage at the control circuit exceeds the instantaneous biased lead-phase voltage.

In one general form of the invention, the means employed to phase-shift the control-circuit voltage for purposes of determining the power delivered to the load is utilized only to shift the reversed reference-phase voltage component, the lead-phase voltage component being maintained without shifting throughout the range of adjustable control. In the other general form of the invention, the phase-shifting means serves both the reversed reference-phase component and the reversed lead-phase component.

Figures 1, 3:
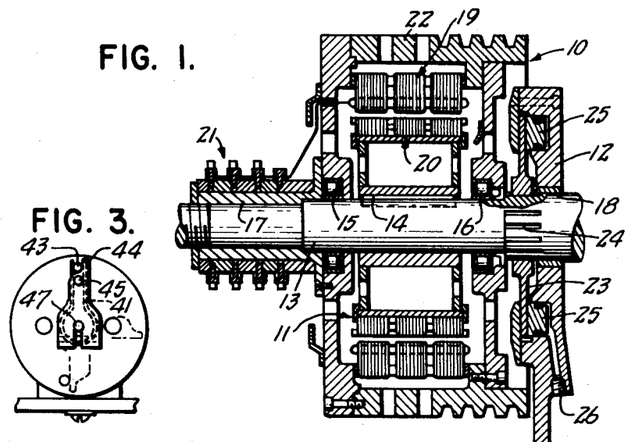
Fig. 1 is a simplified longitudinal sectional view of a prime mover or torque transmitter of the type which may advantageously be supplied with power governed by control means of the invention.
Fig. 3 is a sectional view, taken in the plane 3—3 of Fig. 2.

Referring to Fig. 1 of the drawings, my invention is shown in application to a prime mover or torque transmitter of the character shown and described in greater detail in the above-identified copending application. For the present, it suffices to say that such prime mover comprises coacting electrically excited elements carried by each of two relatively rotatable members 10—11, both of which are mounted for rotation with respect to frame means 12 and about the same axis which, for present purposes, may be identified as a shaft 13. The inner rotatable member is shown keyed at 14 to the shaft, and the outer rotatable member or flywheel 10 is shown mounted on spaced anti-friction bearings 15—16 on the shaft 13. The shaft is journalled in bearings 17—18 in the frame 12.

As indicated generally above, coacting electrically excited elements are carried by each of the relatively rotatable members 10—11. In the form shown, these elements comprise field windings and laminations 19 carried by the outer rotatable member 10, and armature laminations and windings 20 carried by the inner rotatable member 11. The inner and outer windings may be of any variety to develop rotational torque between the two members 10—11, and electrical connections may be made by way of slip-ring and/or commutator means designated generally 21, as is common practice. By this I mean that the elements 19—20 may constitute parts in an otherwise conventional D.-C. or A.-C. motor. However, in the drawings, I indicate schematically the employment of a three-phase induction-motor construction in which the element 20 on the inner rotational member 11 is of the squirrel-cage variety, three-phase excitation being applied to the winding of the outer element 19. Since the outer rotatable member 10 is to constitute the flywheel from which rotational energy is to be transiently extracted, I show the formation of member 10 with very substantial moment of inertia about the rotational axis, as by provision of a large annular mass 22 at maximum radius of the member 10.

To complete the general organization of Fig. 1, means are provided for establishing a braking reference for the shaft 13 (or inner rotational element 11) to the frame. For this purpose, I show a friction-brake plate 23 fitted to a spline 24 and provide piston or brake-shoe means 25 actuated by fluid pressure (supplied at 26) to arrest the shaft 13 and inner rotational element 11 whenever necessary.

As explained in said copending application, the elements 19—20 may be excited not only as motor elements to develop rotational torque between members 10—11, but may also be excited to develop locking or non-rotational torque between members 10—11. In a typical cycle of operation, the brake means 23—25 is first set and the elements 19—20 excited, as by three-phase alternating current, to develop rotational torque. This drives the flywheel member 10 with respect to the frame 12 until a desired amount of angular momentum has been imparted to the flywheel element. The frame reference at 23—25 is then released, and the energy of the rotating flywheel is available for transient application to a load (not shown, but connected to the output shaft 13). To clutch the flywheel to the load, the elements 19—20 are excited, as by direct current, to develop locking torque, so that the inner rotational member 11 (which, for convenience herein, may sometimes be referred to as the rotor) becomes locked to the outer rotational element 10 (which for convenience herein, may sometimes be referred to as the stator, even though it is rotated as long as the device is in use), the flywheel energy is directly imparted to the load.

The transient transfer of flywheel energy to the load will be accompanied by some reduction in flywheel speed, and in order to restore this energy and at the same time to arrest rotation of the rotor 11, the elements 19—20 are again excited to produce rotational torque. When the rotor 11 is thus brought back to substantially zero speed with reference to the frame, automatic speed-responsive means (not shown) reapplies the brake 23—25 so that if by then the flywheel 10 has not been brought up to the desired speed, the remaining speed may be developed by torque reaction against the frame, without further displacing the output shaft 13.

Reviewing the above discussion, it may be said that when the particular device of Fig. 1 is excited with direct current, meaning that the rotor and stator (flywheel) are brought to locking relation, and torque is delivered to the load, we have a "clutching" operation characterized by the development of "positive torque" as far as the output shaft 13 is concerned. Similarly, when the device is excited with alternating current to produce rotational torque between member 10—11, a "braking" function is developed in the output shaft 13, so that as far as the output shaft 13 is concerned, "negative torque" is being delivered. Throughout the present description, and for purposes of more simplified description, clutching and braking action on the one hand, and positive and negative torque on the other hand, will be understood as having the meanings indicated, although a more generalized discussion appears at the close of this specification.

Figures 5, 7:
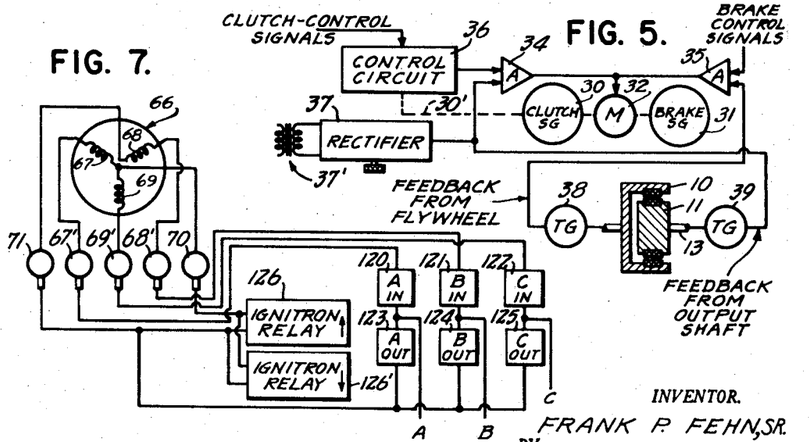
Fig. 5 is a simplified block diagram schematically showing a portion of the control means for the prime mover or torque transmitter of Fig. 1.
Fig. 7 is a simplified diagram along the lines of Fig. 6, but illustrating another general type of control, employing the same basic control circuit as shown in Fig. 6, and utilizing another part of the control element of Fig. 2, to determine another operation of the device of Fig. 1.

In Fig. 5, I show an important part of my general organization for the processing of control signals to achieve selective clutch and brake operations with the device of Fig. 1. As indicated generally above, the device operates from a three-phase source of voltage, and phase-shifting is employed as an important element of the control. In the form shown, phase-shifted signals are developed by two separate three-phase synchro generators or control transformers which, in Fig. 5, are identified as the clutch synchro generator 30 and the brake synchro generator 31. Broadly speaking, the generators 30—31 are differentially connected to a servomotor 32 which is driven in a first direction by signal-processing means including an amplifier 34, and in the opposite direction by similar circuitry including an amplifier 35.

Amplifier 34 operates on clutch-control signals developed by means not shown and not necessary to the present description. For present purposes, it suffices to indicate that such signals are present in a control circuit 36 incorporating means whereby a feedback (shown schematically as a mechanical connection 30' from the clutch synchro-generator shaft) may precisely govern the phase shift or rotor displacement in the clutch synchro generator 30. As will later be explained more fully, the extent of displacement of the clutch synchro generator 30 directly determines the power delivered to the load when clutching action is desired. In a generally similar manner, brake-control signals determine the function of amplifier 35 and, therefore, the shaft positioning or phase shift developed in the brake synchro generator 31.

In the form shown, further control of phase shift (i.e. rotation of motor 32) is achieved by a tachometer generator 38 following rotation of the flywheel 10 to apply a polarized feedback signal to the brake synchro control circuit, so that as the desired maximum flywheel speed is approached and attained, the negative torque developed by reason of braking action may be suitably reduced and finally cut off. In a similar manner, a second tachometer generator 39 follows the output of shaft 13 and applies to the amplifier 34 a polarized control voltage such that, as the desired output speed is approached and attained, clutch coupling is reduced and cut off. Various means may be employed whereby the regulating functions of the feedback circuits 38—39 may be varied not only as a function of time, but also as a function of the desired programming for or actual operation of the particular machine being operated by the prime mover of Fig. 1; for example, current feedback, derived from current in the B phase of the line supply, as by rectifying at 37 (Fig. 5) the voltage developed at the secondary of transformer 37' (Fig. 6) may be applied to govern the clutch-control signal amplified at 34. The specific machine-controlled functions form no part of the present invention and are therefore not discussed further in this specification.

Figure 2:
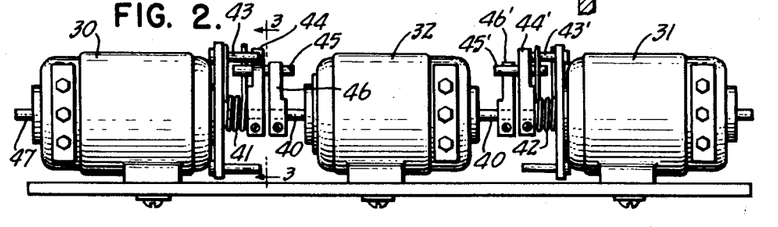
Fig. 2 is a view in elevation of an element of the control means for the device of Fig. 1.

In Fig. 2, I show in greater detail the particular mechanical organization of clutch and brake synchro generators 30—31 and servomotor 32 which I have found to be eminently satisfactory in operation. The motor 32 may be of the so-called stalled-torque variety, meaning that it may be excited to deliver selected positive and negative torques, while stalled. With torque of one polarity, the motor shaft 40 drives (i.e. angularity shifts) say, the clutch synchro generator 30, and with torque of opposite polarity, the motor shaft 40 drives (i.e. angularly shifts) the brake synchro generator 31. In the form shown, springs 41—42 serve to reposition both synchro generators 30—31 to a neutral or mid-position in which no phase shift is produced in either one of the generators 30—31. Preferably, the coupling of shaft 40 to each of the generators 30—31 incorporates a lost motion in each case so that, whenever shaft 40 is effective to rotate the synchro 30 (one direction away from the mid-position), it is ineffective to rotate the synchro 31. By the same taken, rotation of synchro 31 (in the other direction away from the mid-position) involves no rotation of synchro 30.

In the form shown, the zero phase-shift position for synchro 30 is determined by a stop pin 43, fixed to the frame of synchro 30 and determining the limit to which spring 41 can urge an arm 44 on the shaft of the synchro generator 30. The arm 44 supports an elongated pin 45 which may be intercepted by the drive arm 46 carried by the motor shaft 40. Thus, whenever the clutch synchro generator 30 is to be rotated by motor shaft 40, arm 46 will engage pin 45 to relieve arm 44 from the stop 43. The more the displacement of arm 44 (clockwise in the sense of Fig. 2), the more the opposing torque developed by spring 41, and a given phase shift occasioned by rotation of the synchro generator 30 will be achieved when the instantaneous torque developed by motor 32 equals the opposing torque developed by spring 41. Of course, when motor 32 is deenergized, spring 41 returns the synchro generator 30 to the zero phase-shift position.

In a similar manner, and for positions of shaft 40 on the opposite angular side of the reference position determined by spring return to the stop pin 43, the shaft 40 serves to adjustably determine phase shift in the braking synchro generator 31. The parts which actuate generator 31 are analogous to those described for generator 30 and have therefore been given the same reference numerals, with primed notations. Thus, a given braking excitation will be determined by the amount of phase shift (and, therefore, the extent of rotation) of the braking synchro generator 31.

Figure 4:
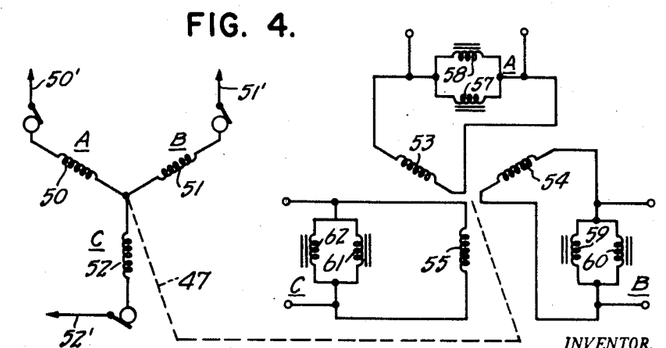
Fig. 4 is an electrical diagram illustrating the internal organization of a part of Fig. 2.

The diagram of Fig. 4 illustrates the internal organization of one of the synchro generators 30—31, and since particular emphasis herein is on clutching, the diagram of Fig. 4 may be viewed as illustrating the windings of synchro generator 30. Generator 30 comprises a rotor having three-phase windings 50—51—52, supplied by slip rings connected at 50'—51'—52' to a three-phase source; the windings 50—51—52 happen to be shown Y-connected. For convenience in the present description, the phase of excitation of winding 50 will be termed the A phase, the phase at winding 51 will be termed the B phase, and the phase at winding 52 will be termed the C phase.

The stator or secondary windings 53—54—55 of generator 30 have orientations corresponding to the primary or rotor windings 50—51—52, but are disconnected, so that no Y-connection is provided. By disconnecting the secondaries or stationary windings 53—54—55, the voltages induced therein can be kept as independent as possible, thereby materially reducing the extent to which transient voltages in one phase are induced in another phase, and totally eliminating circulating transients in the secondary phases.

The output voltages of the synchro generator or control transformer incorporate selected phase shifts, reflecting the instantaneous angular displacement of the generator shaft 47 with respect to the stator; for the secondary winding 53, the selectively shifted A-phase voltage is available by means of one or more transformer coupling elements 57—58, the secondaries or output circuits of transformers 57—58 being omitted in Fig. 4. In a similar manner, separate phase-shifted voltages for the B-phase (secondary winding 54) are available at transformer outputs 59—60, and separate phase-shifted voltages for the C-phase (winding 55) are available at transformer outputs 61—62. At any one instant, i.e. for any given shaft displacement for the synchro generator of Fig. 4, the same phase shift will have been developed in the A, B, and C phases, at outputs 57—58, 59—60, and 61—62, respectively.

Figure 6:
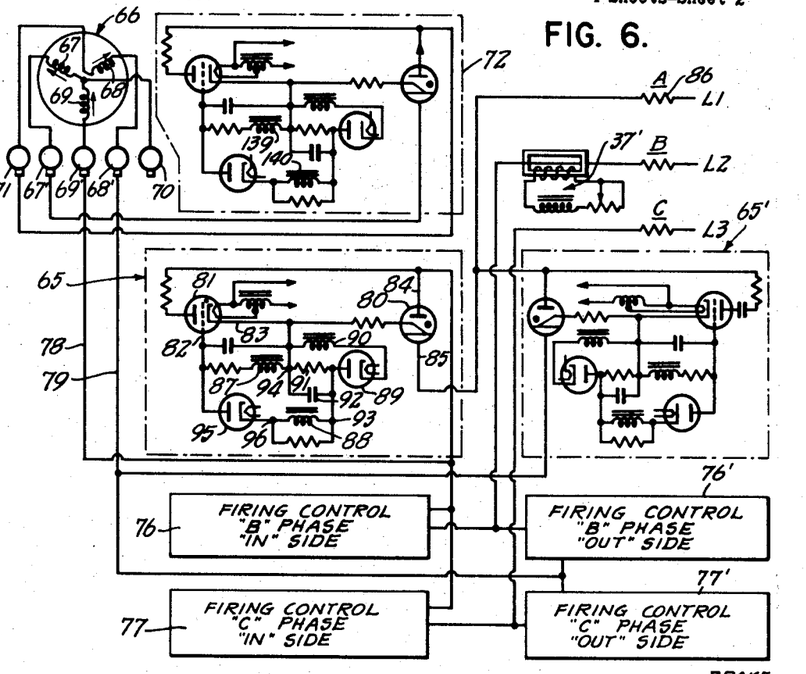
Fig. 6 is an electrical diagram illustrating a basic power-control circuit of the invention, applied to the control of one general type of operation of the device of Fig. 1, utilizing a part of the control element of Fig. 2.

My basic power delivery or control circuit is illustrated in detail at 65 in Fig. 6, and the overall layout of Fig. 6 illustrates utilization of similar circuits (i.e. like circuit 65) in multiple for controlling power delivered to the load 66 to effect clutching action, meaning development of positive torque in the output shaft 13. The showing of load 66 in Fig. 6 will be understood to schematically represent electrical parts of the device of Fig. 1, there being shown three separate windings 67—68—69, which, for the development of motoring torque (braking action) will be Y-connected and excited by three-phase voltages (as described in connection with Fig. 7), but which, for the clutching action (D.-C. excitation) achieved with the circuit of Fig. 6, are connected in series.

In the form shown, separate slip rings 67'—68'—69' provide independent connections to corresponding ends of windings 67—68—69. The other ends of windings 67—69 are shown interconnected, and this point of connection is brought out to a slip ring 70, which is utilized only for development of braking or motoring action, to be described in connection with Fig. 7. The remaining slip ring 71 is connected to the inner end of the remaining winding 68. As indicated, and for development of clutching action, the windings 67—68—69 are connected in series and are excited by D.-C. voltages. The series connection is assured by operation of a relay circuit 72 generally resembling the basic circuit 65; the relay circuit 72 is operative only to complete the series connection of windings 67—68—69 (i.e. only when clutching torque is called for) and is discussed following the description of control circuit 65.

As indicated generally above, the basic control circuit 65 is provided in multiple, the multiple circuits being interconnected to apply controlled quantities of "full-wave" rectified power to load 66. The detailed showing of circuit 65 happens to be for the component which serves what may be termed the "In" side of the A phase; a similar control circuit 65' serves the "Out" side of the A phase. Similarly, control circuits 76—76' serve the "In" and "Out" sides of the B phase, and control circuits 77—77' serve the "In" and "Out" sides of the C phase. The interconnection of circuits 65—65'—76—76'—77—77' is such as to develop D.-C. voltages in the lines 78—79 of supply (at 69'—68') to the series-connected windings of the load 66.

I term my basic circuit 65 a firing-control circuit largely because, in my use of the invention, the prime element 80 relied upon for delivery of power to the load has been a pool-type mercury-vapor gaseous discharge device or ignitron; basically, however, the circuit 65 is merely a relay which may be transiently closed and opened for adjustably varied fractions of the electrical cycle of the particular phase with which it is concerned. The control circuit for the ignitron 80 is shown to be actuated by another gaseous discharge device such as the thyratron 81 in such manner that when the thyratron 81 is fired, so also is the ignitron 80. Considered together, the control devices 80—81 may thus be viewed as having an input circuit defined between the thyratron-grid connection 82 and the thyratron-cathode connection 83, and an output circuit defined between the ignitron-anode connection 84 and the ignitron-pool connection 85.

As indicated, the control circuit 65 in Fig. 6 happens to be concerned with the "In" side of the A-phase, and for purposes of description, this may be termed the reference phase for circuit 65, the pool connection 85 being connected to the A-phase supply line 86 and the anode 84 being connected to the load line 78. Basic control voltage for the input control circuit 82—83 is developed by a non-linear summation of voltage from the reference phase (phase A) and of voltage from the leading phase (phase C). Both of these control voltages are inverted with reference to the line phases. The inverted reference phase (phase A) voltage is developed at winding 87, and the inverted leading-phase voltage (phase C) is developed at winding 88.

I prefer that the leading-phase voltage shall be added to the control-circuit voltage only at such times as reference-phase voltage (winding 87) shall exceed negatively biased leading-phase voltage (winding 88). In the form shown, constant negative bias (i.e. terminal 93 of winding 88 biased negatively with respect to terminal 94 of winding 87) is developed by rectifying means 89 operating from a transformer secondary 90, which may be taken off any phase of the supply; smoothing elements 91—92 assure development of a steady bias voltage. In order that the biased leading-phase voltage may be added to the reference-phase voltage only when the reference-phase voltage exceeds the biased leading-phase voltage, I provide a non-linear resistance, such as a rectifier or diode 95, between the other terminal 96 of the leading-phase winding 88 and the thyratron-grid connection 82.

Reference-phase voltage supplied at 87 is an adjustably phase-shifted voltage which, for the clutching function, is developed by synchro generator 30. Winding 87 may thus be the secondary of the output transformer whose primary 57 has been identified in Fig. 4.

As indicated generally above, in one general organization of my invention, the leading-phase voltage at 88 is not phase-shifted, whereas in the other alternative organization it is phase-shifted. If it is not phase-shifted, the winding 88 may be viewed as the secondary of a transformer whose primary is directly connected to the C-phase of the line, as, for example, across the winding 52 in Fig. 4. If, on the other hand, the leading-phase voltage at 88 is adjustably shifted, the winding 88 may be viewed as the secondary of the output transformer 62, connected across the C-phase of the stator shown in Fig. 4.

Figure 8:
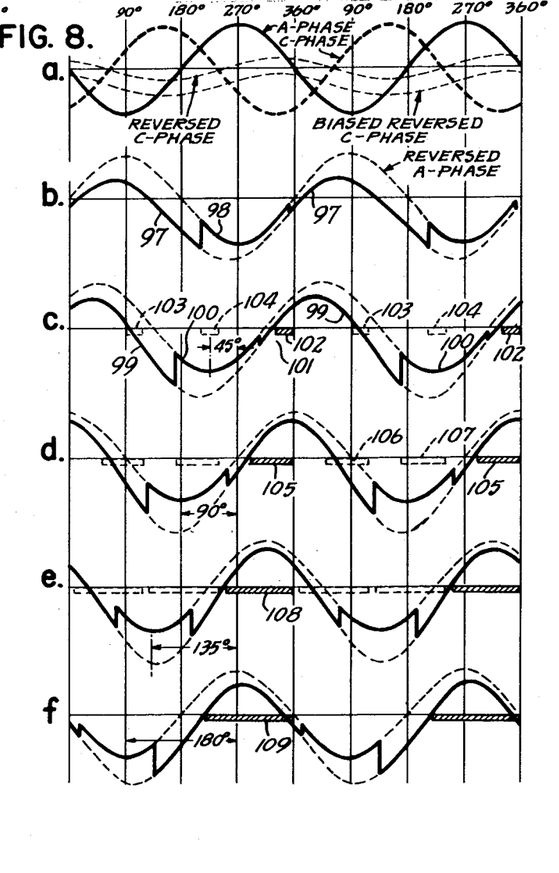
Figs. 8 and 9 are simplified groups of theoretical voltage-time developments illustarting two different types of control available with alternative connections for the basic control circuit of Fig. 6.

The circuit 65 is shown to include further resistance-capacitance elements which serve primarily the function of smoothing certain voltage forms and eliminating undesirable transient effects, but essentially, the circuit 65 comprises the means whereby the reference-phase voltage (at 87) may be vectorially summed with the negatively biased leading-phase voltage (measured between terminals 97—96) whenever the reference-phase voltage exceeds in magnitude the negatively biased leading-phase voltage. This summation is diagrammatically represented in the voltage-time curves of Figs. 8 and 9; Fig. 8 illustrates the situation in which the reference-phase at 87 is shifted while the leading-phase at 88 is not shifted, and Fig. 9 covers the situation in which both the reference-phase at 87 and the leading-phase at 88 are shifted in unison.

In Fig. 8, the plot labelled a depicts certain of the principal voltages, the solid curve representing two complete cycles of the A-phase (reference-phases) voltage applied across the ignitron-output circuit 84—85. The upper dashed curve represents the inverted or reversed C-phase (leading-phase) voltage as developed across the winding 88, and the lower dashed curve represents the negatively biased reversed C-phase voltage as developed across the terminals 94—96. Plots b through f depict voltage relations for various degrees of phase adjustment in the inverted reference-phase voltage at 87, starting with zero phase shift for the case of plot b, 45° phase shift for the case of plot c, and so on, as indicated by legend on the drawing.

In plot b of Fig. 8, the upper lightly dashed curve represents the envelope of inverted A-phase voltage developed in winding 87, it being noted that due solely to the winding 87, the input circuit 82—83 is driven negatively at all times that the output circuit 84—85 is driven positively. The lower profile in plot b represents the vectorial summation of the biased reversed C-phase voltage with the reversed A-phase voltage. Now, due to the action of the rectifier or diode 95, the biased reversed C-phase voltage will be added to the reversed A-phase voltage whenever the latter exceeds the former; but, when the former exceeds the latter, essentially only the reversed A-phase voltage developed in winding 87 will be applied to the input circuit 82—83.

The resultant profile of voltage appears somewhat as shown in the discontinuous heavy outline of plot b. Thus, for the first 210 degrees of plot b, the voltage in winding 87 exceeds the biased leading-phase voltage, and the resultant voltage profile 97 at input circuit 82—83 is substantially reduced below that attributable solely to the reference-phase voltage (winding 87), particularly in the region in which the output-circuit voltage at 84—85 is beginning to rise positive. When the reference-phase voltage reduces to the level of the biased leading-phase voltage, the diode 95 ceases to conduct, and therefore blocks, thereby defining a second portion 98 reflecting only the bottom part of the inverted reference-phase voltage developed at winding 87. When the reference-phase voltage next equals and begins to exceed the biased leading-phase voltage, diode 95 again conducts, thereby reducing the level of voltage applied to the input circuit 82—83 and repeating the profile 97.

It will be noted that for the zero phase-shift condition represented by plot b, the input circuit 82—83 is never permitted to become sufficiently positive (while the output circuit is positive) to fire the control circuit 65. For the condition of plot b, therefore, no power is delivered to the load.

Plot c of Fig. 8 reflects the situation in which the reference-phase voltage at 87 has been shifted by motor 32, acting on the clutching synchro generator 30, to effect a 45-degree phase shift from the condition discussed in connection with plot b. Again, the action of diode 95 is seen to produce a discontinuous profile of voltage at the control circuit 82—83, characterized by alternate steps or profiles 99—100 corresponding to the steps 97—98 of plot b. It will be noted that when the negatively biased leading-phase voltage is added to the reference-phase voltage (step 99), the region of negative voltage applied to the input circuit 82—83 is substantially bodily phase-shifted, but that it nevertheless still substantially brackets the period in which output circuit voltage (at 84—85) is positive. Conduction (transient output-power delivery) begins substantially at the instant designated 101, when the profile or step 99 goes sufficiently positive to fire the tubes 81—80; and conduction continues throughout the period schematically indicated by the shaded bar 102, until termination by reason of output-circuit voltage (at 84—85) passing through zero and then becoming negative.

In plot c, there are indicated, at phantom outlines 103—104, those periods of time in which conduction takes place at the "In" sides of the B-phase and C-phase firing circuits 76—77, for the same phase-shift adjustment which determines the relationship of plot c. It will be understood that, 180 degrees out of phase with the firing of the circuit 65 on the "In" side of the A phase, there is a similar firing of the circuit 75 on the "Out" side of the A phase, and that corresponding "Out" side firings occur in circuits 76'—77', 180 degrees out of phase with firings in the "In" side circuits 76, 77, respectively. The net result is the application of "full-wave" rectified power at load 66 of limited magnitude substantially linearly reflecting the phase-shift adjustment (45° for slot c) in reference-phase voltage at windings 87.

In plot d of Fig. 8, reference-phase voltage developed at winding 87 has been phase-displaced 90 degrees from the condition represented by plot b, while the leading-phase voltage developed at winding 88 has been held unshifted. It will be noted that by reason of the shift depicted in plot d, the circuit 65 fires for a longer interval, designated by the shaded bar 105, in each cycle of reference voltage. Corresponding firing intervals 106—107 for the "In" sides of the B and C phases are shown in phantom outline on the same time scale as that for the "In" side of the A phase. In similar fashion, plots e and f illustrate further phase shifts in the reference voltage at 87, to the extent of 135 degrees and 180 degrees, respectively, and shaded bars 108 in plot e and 109 in plot f illustrate the periods of firing for the circuit 65 in both cases.

Figure 9:
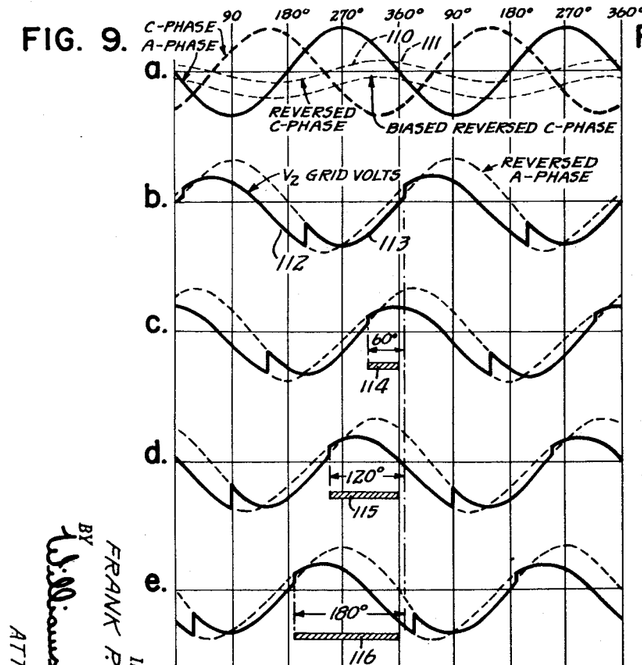

As indicated generally above, the plots of Fig. 9 illustrate the alternative control situation in which not only the reference voltage at 87, but also the leading-phase voltage at 88, are phase-shifted in unison. It so happens that for the relationships depicted in Fig. 9, slightly different relative values have been used both for the bias voltage and for the amplitude of the lead-phase voltage. These relative values are suggested by the lightly dashed curves 110 and 111 in plot a of Fig. 9, curve 110 being the reversed C-phase voltage across the terminals of winding 88, and curve 111 being the same voltage envelope depressed to the extent of the bias.

Plot b of Fig. 9 illustrates the condition of zero phase shift, meaning that the circuit 65 is not caused to fire. It will be noted that again due to the alternating conduction and blocking at diode 95, there results a two-step wave at the control circuit 82—83, the steps being characterized by a first profile 112 reflecting vectorial summation of the reference phase voltage at 87 with the biased leading-phase voltage at 88, and the second profile 113 reflecting merely the reference-phase voltage at 87 during intervals when diode 95 is blocked. In plot c, both the reference-phase voltage at 87 and the leading-phase voltage at 88 have been phase-shifted to the same extent, namely, 60 degrees, as indicated by legend on the drawings. This phase shift determines a conduction period of something less than 60 degrees for firing of circuit 65, as indicated by the shaded bars 114. Similarly, for plots d and e, reflecting further phase shift, correspondingly greater periods of conduction are designated in the drawing by reference numerals 115 and 116, respectively.

It has been indicated that the function of the ignitron relay circuit 72 is to establish load-winding connections appropriate for clutching action (D.-C. excitation). The components of circuit 72 will be recognized as resembling those of circuit 65, a few constants being different from those of circuit 65. For the purposes of Fig. 6, it suffices if relay 72 is continuously operative (to series-connect windings 67—68—69), and to this end I have obtained satisfactory performance with the control circuit of Fig. 10, in which basic control voltages are shown derived from the phase-shifted secondaries 53—54—55 of the clutch synchro generator 30. In the form shown, additional transformers 130—131—132 across these secondary windings supply further transformers 113—134—135, through isolation amplifiers 136—137—138. First corresponding secondaries of transformers 133—134—135 are connected in parallel to supply the phase-shifted "in-phase" component transformer 139 of circuit 72, and second corresponding secondaries are also connected in parallel to supply the phase-shifted "lead-phase" component transformer 140 of circuit 72. It will be seen that, once the control circuits 65—65'—76—76'—77—77' of Fig. 6 have begun to conduct, voltage will be applied across the thyratron and ignitron of circuit 72, and that the phase-shifted voltages at 139—140 will enable circuit 72 to "fire" and to remain continuously "fired" (closed) until the control circuits (such as 65) are adjusted back to zero phase shift (i.e. shut off), it being understood that D.-C. magnetization of the load 67—68—69 between pulsed excitations thereof is sufficient to maintain circuit 72 continuously closed, as long as the control circuits of Fig. 6 are supplying clutching energy.

As indicated generally above, the circuit of Fig. 6 is concerned primarily with firing-control operations governing clutching action, that is, action in which direct current developed by the rectifying action of firing-control circuits 65—65'—76—76'—77—77' is supplied to the windings of the load in series, thus tending to lock the rotor and stator parts 10—11. The arrangement of Fig. 7 illustrates the other basic type of operation available with the control means of Figs. 2, 4 and 5, namely motoring action, that is, action in which rotational torque is developed between the relatively rotating parts. The circuit of Fig. 7 includes a number of firing control circuits 120—121—122—123—124—125, each of which may be completely similar and analogous to the circuit 65 described in detail in connection with Fig. 6. However, the interconnection of the circuits 120 . . . 125 and their manner of connection to the slip rings 67'—68'—69' is such as to achieve three-phase or motoring excitation of the windings 67—68—69 of the load, whenever the braking synchro generator is partially rotated. The only change in connection necessary to achieve three-phase Y-connected load windings in Fig. 7 is to break the ignitron-relay connection established at 71—72 in Fig. 6, and to establish in its place (through ignitron relays 126—126') a connection between the slip-rings 70—71. The ignitron relay circuit 126—126' functions analogously to the relay circuit 72 but only when the servomotor 32 is driven in the direction calling for brake action, and the interconnection of slip rings 70—71 is maintained as long as any degree of brake action is still being called for. Since each ignitron relay is unidirectionally conductive, two oppositely polarized relays 126—126' are required to accommodate the full A.-C. pulsed voltages supplied to the load 66 by circuits 120 . . . 125.

Figures 10, 11, 12:
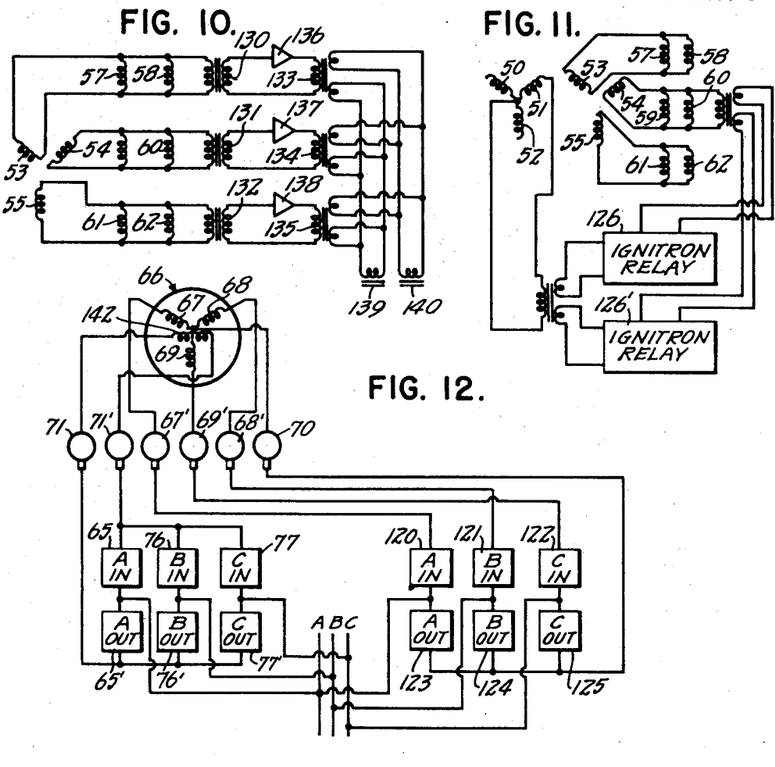
Fig. 10 is a diagram illustrating control components for the ignitron relay of Fig. 6.
Fig. 11 is a diagram similar to Fig. 10 but illustrating control components for the ignitron relays of Fig. 7.
Fig. 12 is a diagram similar to Figs. 6 and 7 but illustrating modified connections to the load.

As indicated generally above, the function of relays 126—126' is to complete the connection of windings 67—68—69 for three-phase or A.-C. excitation. Since the A and C-phase windings 67—69 are always interconnected, it remains only for the B-phase winding 68 to be connected while B-phase voltages are applied (i.e. from control circuits 121—124), and in order to reduce interphase transients, I prefer that the polarized connections established by ignitron relays 126—126' be transiently made and broken only as necessary to accommodate the power pulses developed from the intermediate or B-phase control circuits 121—124. Suitable control connections for relays 126—126' are shown in Fig. 11, wherein phase-shifted B-phase voltage from winding 54 of synchro generator 31 is developed for separate application to the in-phase windings of relays 126—126', it being understood that said in-phase windings correspond to the winding 139 of ignitron relay 72 for clutching operation. For the "lead-phase voltage" (i.e. applied at windings 140 of relays 126—126'), I show preference for direct dependence on the unshifted or line voltage of the intermediate or B phase. With properly selected circuit constants at 126—126' the center connection of winding 68 to windings 67—69 is "gated" to accommodate the power pulses from control circuits 121—124, the "gate" being enlarged as necessary to accommodate various pulse durations, inasmuch as the control circuits 121—124 and the ignitron relays 126—126' both operate from the same phase-shifting means 31. The directional arrows for relays 126—126' in Fig. 7 suggest the oppositely polarized functioning of these relays, as determined by properly polarized connections to windings 139—140 of the respective relays, as will be understood.

It will be seen that upon the occurrence of any control signal calling for brake action (or negative output-torque development), the circuit of Fig. 7 will be called into play to the exclusion of the circuit of Fig. 6, and that the motoring torque which produces brake action will be more or less in direct proportion to the position or displacement effected in the rotor of the brake synchro generator 31, the feedback from the flywheel to the tachometer generator 38 serving to diminish the strength of motoring action (i.e. to reduce motoring torque) as the desired flywheel speed is developed in element 10.

In the discussion thus far, it has been stated that the same load windings are excited one way (with D.-C.) for "clutching" action, and another way (with A.-C.) for "braking" action. In some cases, it is convenient to provide separate A.-C. and D.-C. windings on the same rotatable elements 10—11, thus simplifying control connections, at least to the extent of eliminating the need for the ignitron relays 72—126—126'. Such a circuit is shown in Fig. 12, wherein windings 67—68—69 are permanently interconnected for A.-C. excitation, and the separate winding 142 is permanently connected for D.-C. excitation. The control circuits 65—65'—76—76'—77—77' and 120—120'—121—121'—122—122' will be recognized from Figs. 6 and 7 and therefore need not be further described, it being understood that for "clutching" action, synchro generator 30 will be actuated so as to excite winding 142 directly through control circuits 65—65'—76—76'—77—77', and that for "braking" action, synchro generator 31 will be actuated so as to excite windings 67—68—69 directly through control circuits 120—120'—121—121'—122—122'.

Figure 13:
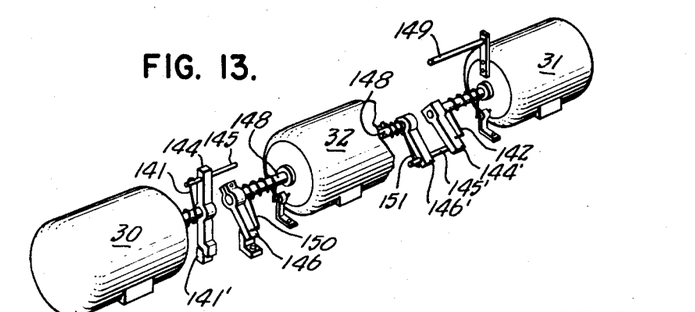
Fig. 13 is a simplified view in perspective illustrating a modified arrangement of the parts of Fig. 2.

The preceding discussion has concerned itself with the differential control of synchro generators 30—31, wherein servomotor 32 is of the bi-directional stalled-torque variety, and wherein the springs 41—42 produce steady torque to restore motor 32 to the midposition, in the absence of motor-developed torque. However, Fig. 13 shows that the invention is not to be considered thus limited, for in Fig. 13 the motor 32 is of the unidirectional stalled-torque variety, and spring 150 constantly urges the same to one extreme position. Synchro generators 30—31 still have distinct and different ranges of movement (control); spring 141 constantly urges the shaft of generator 30 to a midposition (zero phase shift, for clutching) against a stop 141', and spring 142 constantly urges the shaft of generator 31 to its extreme position (maximum phase shift for maximum A.-C. excitation of the load). The arm 144' on the shaft of generator 31 is limited (by stop 149) to movement only throughout the range of A.-C. excitation control, the position at stop 149 being the mid-position for which zero A.-C. control phase shift is developed. The shaft 148 of motor 32 has a lost-motion relation with its arm 146', said lost motion being biased by a spring 151 (stronger than spring 142), so that after having driven generator 31 to its mid-position, there can still be freedom for driving generator 30 to its most extreme position. Thus, the instantaneous position of the motor 32 will be determined by balancing its torque against the opposing torques of one or more of the springs indicated. The excitation of motor 32 will be unidirectional and yet the desired selective and differential control of the phase shifters 30—31 is still achieved. By biasing the unidirectional excitation of motor 32 at a given level, the control system can always be caused to restore itself to a desired normal position upon removal of the control signal to motor 32.

It will be noted that since (in Fig. 13) decreasing phase-shift control is achieved at 31 for increasing excitation of servomotor 32, it becomes necessary to change the sign of the feedback voltage from the flywheel (developed at 38, Fig. 5). In other words, for Fig. 13 the tachometer 38 should develop positive feedback so that motor 32 will tend to be more excited (to determine the mid-position, i.e. arms 144—144' both upright) when the desired top flywheel speed is achieved with reference to the frame.

Throughout this specification "clutching" has been identified with "positive output-torque development" and "braking" has been identified with "negative output-torque development"; this will be understood to have been purely for purposes of simplifying the discussion, inasmuch as the principal emphasis herein has been on control circuits, and since these control circuits may be flexibly employed to provide a variety of drive programs for the output shaft 13 (or inner rotational element 11), all as discussed at greater length in said copending application. For example, upon "motoring" (A.-C. excitation) for a period of time more than sufficient to "brake" the inner element 11 to zero speed, or upon "motoring" commencing with the inner element 11 at zero speed, negative output rotation (i.e. output rotation opposite to the direction of flywheel rotation) will be developed; actually, this is just as much a clutching action as if the windings had been D.-C. excited, the only difference being the direction of output revolutions. By the same token, having developed negative output rotation through "motoring" action (A.-C. excitation), the negative output rotation can be "braked" with reference to the flywheel by D.-C. exciting the windings; if the D.-C. excitation is maintained, the output shaft 13 will be brought back first to zero speed (with reference to the frame), with subsequent development of positive rotation in the output shaft. Thus, both A.-C. and D.-C. excitation of the same windings (Figs. 6–7) or of different windings (Fig. 12) can be caused to develop "braking" and "clutching" action as desired, the only difference being in sign of torque developed in the output shaft 13.

For simplicity and clarity of exposition, discussion of the invention set forth hereinabove has referred in the alternative to excitation of windings 19 either for motoring action or for clutching action, because it is believed that a clearer understanding results from a separate consideration of the functions of these parts. However, it will be appreciated that, under certain circumstances, it may be desirable to provide "simultaneous" or "overlapping" excitation of windings 19. In such case, the separate windings 142 and 67—68—69 (Fig. 12) independently accommodate the two different kinds of excitation, and excitation of the motoring and clutching elements is preferably variably controllable rather than excitation of windings 19 in the alternative to provide motoring action exclusively, or clutching action exclusively.

With separate motoring and clutching windings on the input member, transfer from predominantly motoring excitation (braking, for positive-torque development; clutching, for negative-torque development) to predominantly clutch control (clutching, for positive-torque development; braking, for negative-torque development) of the output shaft 12 may be on a "tightly controlled" faster-response basis. With the employment of separate motoring and clutching windings on the members 10—11, the terms "excitation," "energizing," "de-energizing," and the like, herein will thus be understood to be relative terms, meaning that the torque developed upon excitation of one winding of input member 10 (e.g. motoring or clutching) shall predominate over the torque developed upon excitation of another winding (e.g. clutching or motoring). Control means 65—65'—76—76'—77—77' and 120—121 . . . 125 of Fig. 12 will be understood to sufficiently designate control means for effective output-torque development through simultaneous excitation of the windings on the member 10 to provide motoring and clutching action, by determining which of these windings shall develop the predominate torque at any one time. In this manner, full control, from full speed forward down to slow speed forward, stop, and reverse is available depending upon the sequencing and relative magnitude of the motor or clutch torques caused to predominate.

It will be appreciated that I have described a novel and ingenious control means having particularly useful application in prime movers or torque-transmitting devices of the character discussed generally in connection with Fig. 1, and discussed in greater detail in my said copending application. It is particularly significant that with control circuits of the type discussed at 65, it is possible to achieve reliably defined fine increments of power delivered to the load, whether the load be such as to deliver positive torque or negative torque in the output shaft 13, and more or less regardless of the magnitude of the torque demanded. In the particular application which I have made of my invention, I have employed a relatively high-torque low-inertia servomotor at 32 and have been able to transfer from full clutching torque (meaning full displacement of the clutch synchro generator 30) to full braking torque (meaning full displacement of the brake synchro generator 31) in a matter of 100ths of a second; I have also been able to "jog" a heavy output load, such as the ram of a 500-ton power press, with rapid alternation between lesser levels of clutching and braking torque. The resulting interphase transients have not been such as to disturb the proper firing control in either the clutching circuits of Fig. 6 or the braking circuits of Fig. 7.

Insofar as prime movers of the character indicated are concerned, it is particularly important that the energy of the system can be conserved, by reacting between relatively moving parts of the prime mover and its load (i.e. the machine on which operations are being performed), there being no need to dissipate energy by braking with reference to the frame or by accelerating with reference to the frame, except as necessary to effect minor adjustments in speed. The substantial amount of braking effort is achieved through motoring action which serves the dual purpose of braking the output shaft 13 and of reaccelerating the flywheel 10 substantially to the desired speed.

While I have described the invention in detail for the preferred forms illustrated, it will be understood that modifications may be made within the scope of the invention as defined in the claims which follow.

I claim:

1. In combination, two relatively rotatable masses, winding means coacting between said masses, a gaseous-discharge control device including an input control circuit and an output load circuit connected to said winding means, means exciting said output circuit with an A.-C. voltage, variable phase-shifting means connected to said input circuit, means supplying said phase-shifting means with said A.-C. voltage in such manner that for a reference setting of said phase-shifting means the output of said phase-shifting means to said control circuit is a voltage substantially 180° out of phase with said A.-C. voltage, a supply of voltage substantially lagging said A.-C. voltage, means negatively biasing said supply, and means vectorially adding said biased supply to the output of said phase-shifting means substantially only when the instantaneous magnitude of the output of said phase-shifting means equals or exceeds the instantaneous magnitude of the biased lagging-voltage supply.

2. The combination of claim 1, in which said supply of voltage lags said A.-C. voltage by substantially 60°.

3. The combination of claim 1, in which said last-defined means includes rectifying means connecting the biased lagging-voltage supply to said control circuit.

4. The combination of claim 1, in which said last-defined means includes a diode connecting the biased lagging-voltage supply to said control circuit.

5. In combination, two relatively rotatable masses, winding means coacting between said masses, a gaseous-discharge control device including an input control circuit and an output load circuit connected to said winding means, means exciting said output circuit with an A.-C. voltage, variable phase-shifting means connected to said control circuit, means supplying said phase-shifting means with said A.-C. voltage in such manner that for a reference setting of said phase-shifting means the output of said phase-shifting means to said control circuit is a voltage substantially 180° out of phase with said A.-C. voltage, a supply of voltage substantially lagging said A.-C. voltage, means for variably shifting the phase of said lagging voltage in accordance with variations in the setting of said phase-shifting means, means negatively biasing said supply of lagging voltage, and means vectorially adding said biased supply to the output of said phase-shifting means substantially only when the instantaneous magnitude of the output of said phase-shifting means equals or exceeds the instantaneous magnitude of the biased lagging-voltage supply.

6. In combination, two relatively rotatable masses, winding means coacting between said masses, a gaseous-discharge control device including an input control circuit and an output load circuit connected to said winding means, means exciting said output circuit with an A.-C. voltage, variable phase-shifting means having a first output connected to said control circuit and a second output connected through negatively biased non-linear resistance means to said control circuit, means supplying said phase-shifting means with said A.-C. voltage in such manner that for a reference setting of said phase-shifting means the voltage in said first output is substantially 180° out of phase with said A.-C. voltage and such that the voltage in said second output leads that of said first output by substantially 120°, the bias and connection of said non-linear resistance means being such that the voltage at said second output is vectorially added at said control circuit to the voltage from said first output substantially only when the instantaneous magnitude of the voltage in said first output equals or exceeds the instantaneous magnitude of the biased second output voltage.

7. In combination, relatively rotatable rotor and stator elements, winding means coacting between said elements, a gaseous-discharge control device including an input control circuit and an output load circuit connected to said winding means, a three-phase source of supply, means exciting said output circuit with the voltage of one of said phases, variable phase-shifting means connected to said input circuit, means supplying said phase-shifting means with voltage of said one phase in such polarity that for a reference setting of said phase-shifting means the output of said phase-shifting means to said control circuit is a voltage substantially 180° out of phase with the voltage in said output circuit, means inverting the voltage in the phase which leads said one phase, means negatively biasing the inverted lead-phase voltage, and means vectorially adding said biased voltage to the output of said phase-shifting means substantially only when the instantaneous magnitude of the output of said phase-shifting means equals or exceeds the instantaneous magnitude of said biased voltage.

8. In combination, two relatively rotatable torque-developing elements, winding means coacting between said elements, a gaseous-discharge control device including an input control circuit and an output load circuit connected to said winding means, a three-phase source of supply, means connecting the voltage of one of said phases to said output circuit, variable phase-shifting means accepting voltage from said one phase and voltage from the phase which leads said one phase and developing two corresponding phase-displaced outputs, means connecting said input circuit with that one of said phase-displaced outputs which corresponds with said one phase, said last-mentioned connection being in such manner that for a reference setting of said phase-shifting means the voltage of said first phase-displaced output is substantially 180° out of phase with the voltage in said output circuit, and means including a rectifier connecting said second phase-displaced output of said phase-shifting means to said control circuit in such manner that said second phase-displaced output leads by substantially 120° the voltage of said first phase-displaced output.

9. Torque-transmitting mechanism, comprising two relatively rotatable members, three-phase winding means coacting between said members, and three-phase control means connected to said winding means; said control means comprising in combination three like gaseous-discharge control devices, each of which includes an input control circuit and a load circuit, a three-phase supply including separate phase connections to the respective load circuits of said control devices, variable phase-shifting means connecting the respective phases of said supply to said input circuits in such manner that for a reference setting of said phase-shifting means and for any particular one of said control devices the output of said phase-shifting means to the input circuit for said particular device is a voltage substantially 180° out of phase with the voltage applied to the load circuit for said particular device, a three-phase supply of voltages substantially leading each of the respective voltage outputs of said phase-shifting means at said input circuits, and negatively biased means including separate rectifiers separately connecting each of said leading voltages to said respective input circuits.

10. Torque-transmitting mechanism, comprising two relatively rotatable members, three-phase winding means coacting between said members, and three-phase control means connected to said winding means; said control means comprising in combination three like gaseous-discharge control devices, each of which includes an input circuit and a load circuit, a three-phase supply including separate phase connections to the respective load circuits of said control devices, variable phase-shifting means having separate inputs connected to each of the phases of said supply, said phase-shifting means including for each particular control device a first output connected to the input circuit for said particular control device and applying thereto a voltage of variably shifted phase in such manner that for a reference setting of said phase-shifting means the voltage in said first output is substantially 180° out of phase with the voltage applied to the load circuit for said particular device, the voltage in said second output leading by one phase the voltage in said first output, and means including a negatively biased rectifier connecting said second output to the control circuit for said particular device.

11. Mechanism according to claim 10, in which said phase-shifting means is a synchro generator, the secondary windings of which are disconnected from each other.

12. Torque-transmitting mechanism, comprising two relatively rotatable members, three-phase winding means coacting between said members, and three-phase control means connected to said winding means; said control means comprising in combination six like gaseous-discharge control devices, each of which includes a control circuit and a load circuit, a three-phase voltage supply delivering a first three-phase-displaced voltages and a second three phase-displaced voltages 180° out of phase with said first three phase-displaced voltages, each of the six voltages from said supply being connected to the load circuits of said respective control devices, variable phase-shifting means connecting the respective polarized phases of said supply to said control circuits in such manner that for a reference setting of said phase-shifting means and for any particular control device the output of said phase-shifting means to the control circuit for said particular device is a reference voltage substantially 180° out of phase with the voltage applied to the load circuit for said particular device, a supply of six phase-displaced voltages leading by equal amounts the voltages applied by said phase-shifting means to the respective input circuits of said control devices, and means including a negatively biased rectifier connecting each one of said leading-phase voltages in leading-phase relation with the reference voltage at each of said input circuits.

13. Mechanism according to claim 12, in which said six-phase supply is taken from the output of said phase-shifting means, whereby the negatively biased voltages and the reference voltages are all phase-shifted in unison.

14. Torque-transmitting mechanism, comprising two relatively rotatable elements, three-phase winding means coacting between said elements, and three-phase control means for said winding means; said control means comprising in combination three like gaseous-discharge control devices each of which includes an input control circuit and a load circuit, a three-phase supply including separate phase connections to the respective load circuits of said control devices, variable phase-shifting means connecting the respective phases of said supply to said input circuits in such manner that for a reference setting of said phase-shifting means and for any particular one of said control devices the output of said phase-shifting means to the input circuit for said particular device is a reference voltage substantially 180° out of phase with the voltage applied to the load circuit for said particular device, a three-phase supply of voltages substantially leading each of the respective reference-voltage outputs of said phase-shifting means at said input circuits, and negatively biased means including separate diodes separately connecting each of said leading voltages to said respective input circuits.

15. Torque-transmitting mechanism, comprising two relatively rotatable elements, multiple-phase winding means coacting between said elements, and multiple-phase control means for said winding means; said control means comprising in combination a plurality of like gaseous-discharge control devices each of which includes an input control circuit and a load circuit, a multiple-phase supply including separate phase connections to the respective load circuits of said control devices, variable phase-shifting means connecting the respective phases of said supply to said input circuits in such manner that for a reference setting of said phase-shifting means and for any particular control device the output of said phase-shifting means to the input circuit for said particular device is a reference voltage substantially 180° out of phase with the voltage applied to the load circuit for said particular device, a multiple-phase supply of voltages substantially leading each of the respective reference-voltage outputs of said phase shifting means at said input circuits, and negatively biased means including separate rectifiers separately connecting each of said leading voltages to said respective input circuits.

16. In combination, an electrical load, two separate phase-sensitive power-control circuits having different connections to said load, variable phase-shifting means, and means selectively and alternately connecting said phase-shifting means to said power-control circuits.

17. In combination, an electrical load, two separate phase-sensitive power-control circuits having different connections to said load, two variable phase-shifting devices respectively connected in controlling relation with said power-control circuits, and means differentially interconnecting said phase-shifting devices.

18. In combination, an electrical load, two separate phase-sensitive power-control circuits having different connections to said load, two variable phase-shifting devices respectively connected in controlling relation with said power-control circuits, and means including a servomotor connected to control one of said phase-shifting devices for rotation in a first direction and to control the other of said phase-shifting devices for rotation in the opposite direction.

19. In combination, an electrical load, two separate phase-sensitive power-control circuits having different connections to said load, two variable phase-shifting devices respectively connected in controlling relation with said power-control circuits, stalled-torque motor means for selectively reversibly driving said motor means, means continuously applying residual restoring torque to position said motor in a reference position in the absence of sufficient excitation of said motor, said motor being connected to control one of said phase-shifting devices for a first direction of rotation and the other of said phase-shifting devices for the opposite direction of rotation.

20. The combination of claim 19, in which said reference position is symmetrically located with respect to the motor displacements necessary to operate said respective phase-shifting devices.

21. In combination, an electrical load, two separate phase-sensitive power-control circuits having different connections to said load, two variable phase-shifting devices respectively connected in controlling relation with said power-control circuits, a stalled-torque motor having a first range of displacements in which one of said phase-shifting devices is controlled substantially to the exclusion of the other of said phase-shifting devices and having a second range of displacements in which said other phase-shifting device is controlled substantially to the exclusion of said one phase-shifting device, and means continuously applying residual torque to position said motor in a reference position in the absence of sufficient excitation to offset said residual torque.

22. The combination of claim 21, in which said last-defined means continuously urges said motor to a position thereof intermediate said ranges.

23. The combination of claim 21, in which said last-defined means continuously urges said motor to a position in one of said ranges.

24. In combination, two relatively rotatable masses, each of said masses being free rotatable, winding means coacting between said masses, a first supply connection to said winding means and developing a first relative torque between said masses, a second supply connection to said winding means and developing a second relative torque between said masses, two separate phase-sensitive power-control circuits for said respective supply connections, two variable phase-shifting devices respectively connected in controlling relation with said power-control circuits, and means differentially inter-connecting said phase-shifting devices.

25. In combination, two relatively rotatable masses, winding means coacting between said masses, a first supply connection to said winding means and developing a first relative torque between said masses, a second supply connection to said winding means and developing a second relative torque between said masses, two separate phase-sensitive power-control circuits for said respective supply connections, two variable phase-shifting devices respectively connected in controlling relation with said power-control circuits, means differentially interconnecting said phase-shifting devices, and a feedback-control connection responsive to rotation of one of said masses and in controlling relation with one of said phase-shifting devices.

26. In combination, two relatively rotatable masses, winding means coacting between said masses, a first supply connection to said winding means and developing a first relative torque between said masses, a second supply connection to said winding means and developing a second relative torque between said masses, two separate phase-sensitive power-control circuits for said respective supply connections, two variable phase-shifting devices respectively connected in controlling relation with said power-control circuits, means differentially interconnecting said phase-shifting devices, a first feedback-control connection responsive to rotation of one of said masses and in controlling relation with one of said phase-shifting devices, and a second feedback-control connection responsive to rotation of the other of said masses and in controlling relation with the other of said phase-shifting devices.

27. In combination, two relatively rotatable masses, winding means coacting between said masses, a first supply connection to said winding means and developing a first relative torque between said masses, a second supply connection to said winding means and developing a second relative torque between said masses, two separate phase-sensitive power-control circuits for said respective supply connections, two variable phase-shifting devices respectively connected in controlling relation with said power-control circuits, a stalled-torque motor connected to operate one of said phase-shifting devices for a first range of operation and the other of said phase-shifting devices for another range of operation, means continuously applying residual torque to position said motor in a reference position in the absence of sufficient excitation to offset said residual torque, and a feedback connection responsive to rotation of one of said masses and connected in controlling-relation with said motor in such manner as to modify the torque delivered by said motor in accordance with the feedback signal.

28. In combination, an electrical load, two separate three-phase phase-sensitive power-control circuits having different connections to said load, two three-phase variable phase-shifting devices respectively connected in controlling relation with said power-control circuits, and differentially connected control means for said phase-shifting devices.

29. In combination, an electrical load, two separate three-phase phase-sensitive power-control circuits having different connections to said load, two three-phase variable phase-shifting devices respectively connected in controlling relation with said power-control circuits, and differentially connected control means including a rotatable member for displacing said phase-shifting devices; the connection for said last-mentioned means being such, for a given direction of rotation thereof, as to develop advancing-phase displacements in one of said phase-shifting devices and to develop retarding-phase displacements in the other of said phase-shifting devices.

30. The combination of claim 29, in which for a mid-position of said rotatable member both said phase-shifting devices yield output voltages involving no phase displacement.

31. The combination of claim 29, in which for a mid-position of said rotatable member both said phase-shifting devices yield cophasal output voltages in the corresponding phases thereof.

32. In combination, two relatively rotatable masses, winding means coacting between said masses, a first supply connection to said winding means and developing a first relative torque between said masses, a second supply connection to said winding means and developing a second relative torque between said masses, two separate phase-sensitive power-control circuits for said respective supply connections, two variable phase-shifting devices respectively connected in controlling relation with said power-control circuits, means differentially interconnecting said phase-shifting devices, and a feedback-control connection responsive to line current consumption in the supply to said power-control circuits and in controlling relation with one of said phase-shifting devices.

33. In combination, two relatively rotatable masses, winding elements coacting between said masses, a first supply connection including phase-sensitive relay means operative to connect said winding elements to develop a first relative torque between said masses, a second supply connection including further phase-sensitive relay means operative to connect said winding elements to develop a second relative torque between said masses, two separate phase-sensitive power-control circuits for said respective supply connections, two variable phase-shifting devices respectively connected in controlling relation with said relay means and with said power-control circuits, and means differentially interconnecting said phase-shifting devices.

34. The combination of claim 24, in which said winding means comprises a single set of windings, said first connection and said second connection both being made to windings of said set.

35. The combination of claim 24, in which said winding means comprises at least two separate windings, said first connection being made to one of said windings, and said second connection being made to the other of said windings.

36. In combination, two relatively rotatable masses, each of said masses being freely rotatable, winding means coacting between said masses, a first supply connection to said winding means and developing a motoring torque between said masses, a second supply connection to said winding means and developing a clutching torque between said masses, two separate phase-sensitive power-control circuits for said respective supply connections, two variable phase-shifting devices respectively connected in controlling relation with said power-control circuits, and means differentially interconnecting said phase-shifting devices.

37. In combination, two relatively rotatable masses, electric-winding means coacting between said masses, an electric supply connection to said winding means to develop torque therebetween, said connection including ignitron switching means and phase-shift rontrol means therefor, first feedback-control means responsive to instantaneous rotational speed of one of said masses and in controlling relation with said phase-shift control means, and second feedback-control means responsive to the instantaneous relative torque load on said masses and in controlling relation with said phase-shift control means.

38. The combination according to claim 37, in which said second feedback-control means includes a connection responsive to line-current consumption in said electric supply connections.

39. In combination, two relatively rotatable masses, electric winding means coacting between said masses, an electric supply connection to said winding means to develop torque therebetween, said connection including phase-sensitive power control circuits and phase-shift control means therefor, first feedback-control means responsive to instantaneous rotational speed of one of said masses and in controlling relation with said phase-shift control means, and second feedback-control means responsive to the instantaneous relative torque load on said masses and in controlling relation with said phase-shift control means.

40. In combination, an electrical load, two separate phase-sensitive power-control circuits having different connections to said load, two variable phase-shifting devices respectively connected in controlling relation with the power-control circuits, means differentially connecting said phase-shifting devices, and feedback-control means responsive to the instantaneous load and in controlling relation with one of said phase-shifting devices.

41. In combination, a frame, two relatively rotatable masses journalled for rotation independent of said frame, winding means coacting between said masses, means for exciting said winding means with A.-C. power to develop a first rotational torque between said masses, D.-C. excitation means for said winding means to develop a second rotational relative torque between said masses, and tachometer generator means responsive to rotation of one of said masses with respect to said frame and in controlling relation with one of said excitation means.

References Cited in the file of this patent

UNITED STATES PATENTS

| | | |
|---|---|---|
| 1,669,150 | Umansky | May 8, 1928 |
| 2,202,732 | Garman | May 28, 1940 |
| 2,290,657 | Vedder | July 21, 1942 |
| 2,514,896 | Noodleman | July 11, 1950 |
| 2,625,672 | Calvert | Jan. 13, 1953 |